(12) United States Patent
Kobayashi

(10) Patent No.: US 8,976,404 B2
(45) Date of Patent: Mar. 10, 2015

(54) PRINTING APPARATUS FOR STORING AND LOADING SETTING VALUES WHEN TRANSITIONING POWER SAVING STATES

(75) Inventor: Yu Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 664 days.

(21) Appl. No.: 13/007,561

(22) Filed: Jan. 14, 2011

(65) Prior Publication Data

US 2011/0194148 A1 Aug. 11, 2011

(30) Foreign Application Priority Data

Feb. 20, 2010 (JP) ................. 2010-026863

(51) Int. Cl.
*G06K 15/00* (2006.01)
*B41J 29/38* (2006.01)

(52) U.S. Cl.
CPC ............... *B41J 29/38* (2013.01); *G06K 15/406* (2013.01)
USPC .......... 358/1.16; 711/162; 713/300; 713/320; 713/323; 713/324; 713/330; 399/88

(58) Field of Classification Search
CPC ..................................... G06F 3/1231
USPC ...................................... 358/1.16
See application file for complete search history.

(56) References Cited

U.S. PATENT DOCUMENTS

| 2004/0057069 | A1* | 3/2004 | Ikeda | 358/1.14 |
| 2007/0046995 | A1* | 3/2007 | Toda | 358/1.16 |
| 2008/0158574 | A1* | 7/2008 | Sugiyama | 358/1.1 |
| 2009/0222546 | A1* | 9/2009 | Hatano | 709/223 |
| 2009/0244588 | A1* | 10/2009 | Kuroishi et al. | 358/1.14 |

FOREIGN PATENT DOCUMENTS

| JP | 08-063051 | 8/1996 |
| JP | 2000-158756 | 11/1998 |
| JP | 2002-251108 | 6/2002 |

* cited by examiner

*Primary Examiner* — Benjamin O Dulaney
(74) *Attorney, Agent, or Firm* — Maschoff Brennan

(57) ABSTRACT

A printing apparatus having a printing engine, a first control unit, and a second control unit, in which a normal operation is performed by at least the printing engine and the first control unit, a first power saving operation is performed by at least the first control unit while the printing engine is stopped, and a second power saving operation is performed by only the second control unit, the printing apparatus including: a first storage unit of the first control unit that stores a setting value reflecting a setting change performed while the printing apparatus is operated and an operation value not reflecting the setting change performed while the printing apparatus is operated; a second storage unit of the second control unit that stores the setting value and the operation value.

8 Claims, 8 Drawing Sheets

PRINTING APPARATUS FOR STORING AND LOADING SETTING VALUES WHEN TRANSITIONING POWER SAVING STATES

BACKGROUND

1. Technical Field

The present invention relates to a printing apparatus and a method of controlling the printing apparatus, and particularly, to a printing apparatus, which may include a printing engine, a first control unit, and a second control unit, and to a method of controlling the printing apparatus.

2. Related Art

There is disclosed in JP-A-2002-251108, an apparatus which may store a setting value and an operating value in a Non Volatile Random Access Memory (NVRAM) mounted in an operation unit when a state of the apparatus is shifted to an idle mode, and restore the setting value and the operating value during a return from the idle mode, so that the apparatus may be used in the same state as that before entering into the idle mode.

However, there may be cases where it is not possible to store information in an apparatus where a storage destination of the setting value does not have a self-refresh function. Also, in JP-A-2002-251108, during an idle mode when operations of a main control panel and an input/output (I/O) control panel are stopped, a peripheral Application Specific Integrated Circuit (ASIC) performing a communication with a host such as a personal computer may not be able to gain access to the NVRAM where the setting value is stored. Also, in JP-A-2002-251108, a case where information is acquired by the host is not considered. Accordingly, in a case in which when the host intends to acquire information relating to the setting value when the state of the apparatus is shifted to the idle mode, the apparatus is restored from the idle mode to return a response.

SUMMARY

An aspect of the present invention is to provide a printing apparatus and a method of controlling the printing apparatus, which may implement a plurality of power-saving levels and operate without making a user conscious of the plurality of power-saving levels.

According to an aspect of the invention, there is provided a printing apparatus having a printing engine, a first control unit, and a second control unit, in which a normal operation is performed by at least the printing engine and the first control unit, a first power saving operation is performed by at least the first control unit while the printing engine is stopped, and a second power saving operation is performed by only the second control unit, the printing apparatus including: a first storage unit of the first control unit that stores a setting value and an operation value; and a second storage unit of the second control unit that stores the setting value and the operation value. Here, both the setting value and the operation value are values representing a setting with respect to a setting item. However, the setting value reflects a setting change performed during operation of the printing apparatus, and the operation value does not reflect the setting change performed during the operation of the printing apparatus.

In addition, since the printing apparatus further includes a setting value backup unit that stores the setting and operation values of the first storage unit in the second storage unit when the normal operation or the first power saving operation is shifted to the second power saving operation, the setting value and the operation value each stored in the first storage unit are stored in the second storage unit when the normal operation is shifted to the second power saving operation or when the first power saving operation is shifted to the second power saving operation. Accordingly, even though operation of the first control unit is stopped when shifted to the second power saving operation, and the setting value and the operation value each stored in the first storage unit are lost, the backup remains in the second storage unit.

In addition, the second control unit includes a setting value-change receiving unit that receives a change in the setting value stored in the second storage unit. That is, it is possible for a user to perform the setting change of the setting item even during the second power saving operation, and the setting change performed during the second power saving operation is reflected in the setting value stored in the second storage unit.

In addition, the printing apparatus further includes a setting value management unit that rewrites the setting value and the operation value from the second storage unit to the first storage unit when the second power saving operation is shifted to the normal operation or when the second power saving operation is shifted to the first power saving operation, reflects the setting value in a first type of setting item which reflects, in the operation, a setting change performed during operation of the printing apparatus, and reflects the operation value in a second type of setting item which does not reflect, in the operation, the setting change performed during the operation of the printing apparatus.

Here, the first type of setting item is a setting item that immediately reflects, in the operation, the setting change performed during the operation of the printing apparatus, and the second type of setting item is a setting item that does not reflect, in the operation, the setting change performed during the operation of the printing apparatus. By rewriting the setting value and the operation value from the second storage unit to the first storage unit, the setting value and the operation value each required when the first control unit is operated is restored in an appropriate storage region. In addition, since the setting value is reflected in the first type of setting item, the setting change performed during the operation of the printing apparatus including the normal operation, the first power saving operation, and the second power saving operation is reflected. On the other hand, since the operation value is reflected in the second type of setting item, the setting change performed during the operation of the printing apparatus including the normal operation, the first power saving operation, and the second power saving operation is not reflected.

As described above, an operation using an appropriate setting value or operation value may be performed by backing up the setting value and the operation value when the second power saving operation is shifted to the normal operation or the first power saving operation, and a change in the setting value is performed during the second power saving operation, so that an operation to which the appropriate setting value or operation value is applied even in a case where the setting value is changed during the second power saving operation may be performed in the normal operation or the first power saving operation after restoration. Accordingly, a user is unaware of a difference between the first power saving operation and the second power saving operation, and a user is unaware of a difference between a case of return from the first power saving operation to the normal operation and a case of return from the second power saving operation to the normal operation.

It is preferable that the first type of setting item includes at least one of a display language of a display unit, a paper size of a paper feeder, a time setting, and a shift condition from the normal operation to the first power saving operation or the second power saving operation.

No problems arise even when these setting items are changed during operation of the printing apparatus, and there is no problem even though a change is reflected during the operation. In addition, since these settings are settings relating to a user interface, the user feels suspicious and becomes confused when these settings are not immediately reflected. That is, by determining these setting items as the first type of setting item, the suspicion and confusion of the user may be prevented.

It is preferable that the second type of setting item includes at least one of an Internet Protocol (IP) address used for network connection, a region setting of a Random Access Memory (RAM) disk, a switching setting for use/non-use of network I/F, and an on/off setting of automatic detection for a paper size of each paper feed cassette.

Faults may occur when these setting items are changed during the operation of the printing apparatus. In addition, since these setting items are not directly related to the user interface, the suspicions of the user are not aroused even though these setting items are not immediately reflected. That is, the change in the setting is maintained until a time when the setting may be stably changed, and operation faults are prevented from occurring.

It is preferable that when there is an inquiry relating to the printing apparatus from an external apparatus connected to the printing apparatus during operation in the second power saving operation, the second control unit responds based on the setting value and the operation value each stored in the second storage unit.

According to this configuration, a response may be provided based on a value of the second storage unit without returning to the normal operation or the first power saving operation even when there is a requirement to respond based on the setting value and the operation in response to the inquiry from the external apparatus during the second power saving operation.

It is preferable that the first storage unit is a volatile storage medium not having a self-refresh function. The invention is effectively applied even in the case where the first storage unit has the self-refresh function or a case of a non-volatile storage medium, however, the invention is more effectively applied in a case where the first storage unit does not have the self-refresh function.

In addition, the above described printing apparatus includes various embodiments such as being executed in a state of being incorporated in other apparatuses, executed together with other methods, or the like. Also, the invention may be executed in a printing system including the above described printing apparatus, a control method having processes corresponding to a configuration of the above described apparatus, a program for executing, in a computer, functions corresponding to a configuration of the above described apparatus, a computer-readable recording medium storing the program, and the like. In the printing system, a method of controlling the printing apparatus, a control program of the printing apparatus, and a medium recording each program, the above described functions and efficiencies are obtained. Obviously, the configuration described above may be applicable to the system, the method, the program, and the recording medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the present invention will now be described in detail in the following order: 1. a configuration of the embodiment, 2. a power saving process, 3. a return process from power saving, and 4. summary and modified example.

1. Configuration of the Embodiment

In a printing apparatus according to an embodiment of the invention, various types of power saving operations are automatically selected depending on the usage of each part. The various types of power saving operations include a normal operation where a power saving is not performed, a first power saving operation having a degree of power saving higher than that of the normal operation, and a second power saving operation having a degree of power saving higher than that of the first power saving operation.

More specifically, in the normal operation, a printing engine and a first control unit are operated, and in the first power saving operation, the printing engine is turned off, and the first control unit is operated. Also, in the second power saving operation, the printing engine and the first control unit are turned off, and only the second control unit is operated. The printing engine is a printing device or an object for controlling the printing device, the first control unit receives print jobs or performs various image processes in the print jobs, and the second control unit performs a communication control with an external apparatus during power saving or performs a return control from the power saving.

Hereinafter, exemplary embodiments of the present invention will now be described in detail with reference to the accompanying drawings. Further, as an example of the printing apparatus, a printer where a printing is performed in a laser scheme will be described; however, the printing apparatus of the invention is not limited thereto, and a copy machine or a multifunction peripheral is also applicable. In addition, a printing method is not limited to the laser scheme, and ink jet scheme or a dot impact scheme is applicable.

Figure 1:
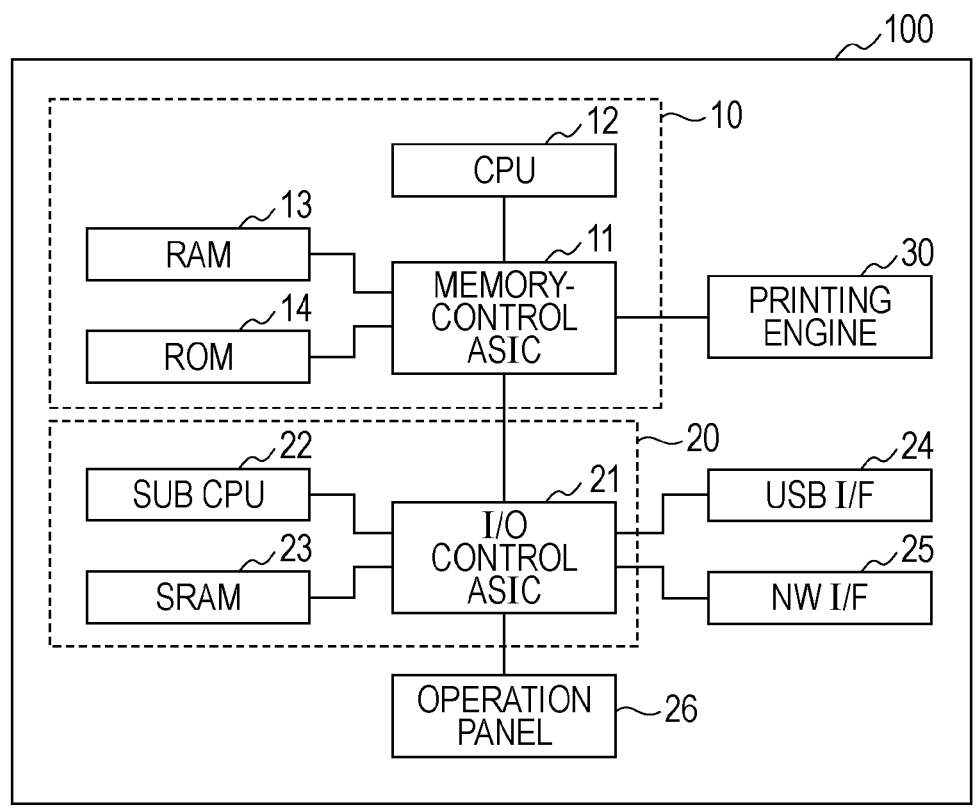
FIG. 1 is a block view showing a hardware configuration of a printer.

FIG. 1 is a block view showing a hardware configuration of a printer 100. As shown in FIG. 1, a printer 100 includes a first control unit 10, a second control unit 20, and a printing engine 30.

The first control unit 10 receives input of image data and a print command from an external personal computer and the like, and performs a predetermined image processing on the received image data to thereby output the image data to the printing engine 30. Thus, the first control unit 10 includes a memory control Application Specific Integrated Circuit (ASIC) 11, a Central Processing Unit (CPU) 12, a Random Access Memory (RAM) 13, and a Read Only Memory (ROM) 14.

The memory control ASIC 11 is a custom Integrated Circuit (IC) for managing access to various memories, and is connected to the CPU 12, the RAM 13, the ROM 14, and the printing engine 30. The CPU 12, the RAM 13, and the ROM 14 are communicably connected to each other through the memory control ASIC 11, and a firmware stored in the ROM 14 is executed while the CPU 12 uses the RAM 13 as a work area, so that the printing engine 30 and the second control unit 20 are controlled.

When receiving the input of the image data and the print command from the external personal computer and the like which are connected to, for example, an NW I/F 25, the first control unit 10 performs the predetermined image processing with respect to the image data, and outputs, to the printing engine 30, the image data and the print command where the image processing is performed.

Then, the printing engine 30 generates an image such as characters and images on a printing paper based on instructed contents (contents indicating the print command and the image data inputted from the first control unit 10) from the first control unit 10. For example, in a case in which the printer 100 is an electrophotographic printer, the printing engine 30 adheres, to the photosensitive drum, a toner corresponding to each dot of the image data by scanning a photosensitive drum using a laser beam while irradiating the photosensitive drum at an appropriate time, and attaches, to the printing paper, the toner adhered to the photosensitive drum.

In addition, the first control unit 10 is connected to the second control unit 20, and is accessible to a network such as a LAN, USB, or the like, through the second control unit 20. The second control unit 20 includes an I/O control ASIC 21, a sub CPU 22, and an SRAM 23, and is connected to a USB I/F 24, a network I/F 25 (NW I/F 25), and an operation panel 26 acting as a user interface where various operation inputs are performed by a user.

The I/O control ASIC 21 is the custom IC for managing various inputs and outputs, and is connected to the sub CPU 22, the SRAM 23, the USB I/F 24, the NW I/F 25, and the operation panel 26. The sub CPU 22 executes a firmware stored in the ROM (not shown) while using the SRAM as a work area, so that inputs and outputs with respect to the SRAM 23, the USB I/F 24, the NW I/F 25, and the operation panel 26 are controlled. Further, the I/O control ASIC 21 operates according to a control of the first control unit 10 in the normal operation or a power saving level 1, and operates according to a control of the second control unit 20 in a power saving level 2. The sub CPU 22 and the SRAM 23 of the second control unit 20 may be stopped at the time of the normal operation or the power saving level 1.

In addition, the first control unit 10 changes various setting values stored in a predetermined storage region of the RAM 13 when a user performs an operation of changing the various setting values with respect to, for example, the operation panel 26. The RAM 13 is a volatile memory that is volatized when power supply is stopped. That is, when the memory control ASIC 11 is stopped, the setting value stored in the RAM 13 is volatized. Thus, in the RAM 13, the setting value is divided into a user setting value and an operation value to be stored as described in section "2" below, and the setting value is backed up in the SRAM 23 when the memory control ASIC 11 is stopped. Further, even in a case where the setting value is stored in a fresh memory or a non-volatile memory such as an NVRAM where a self-refresh is possible, the same effects as those in the embodiment are obtained by realizing a configuration and performing a backup of the setting value of the embodiment when access is not possible at the time of a power saving operation.

In addition, the sub CPU 22 of the second control unit may change the various setting values stored in the predetermined storage region of the SRAM 23 in a second power saving state when the user performs the operation of changing the various setting values with respect to the operation panel 26. In the SRAM 23, the setting value is divided into the user setting value and an operation value to be stored as described in section "2" below.

Figure 2:
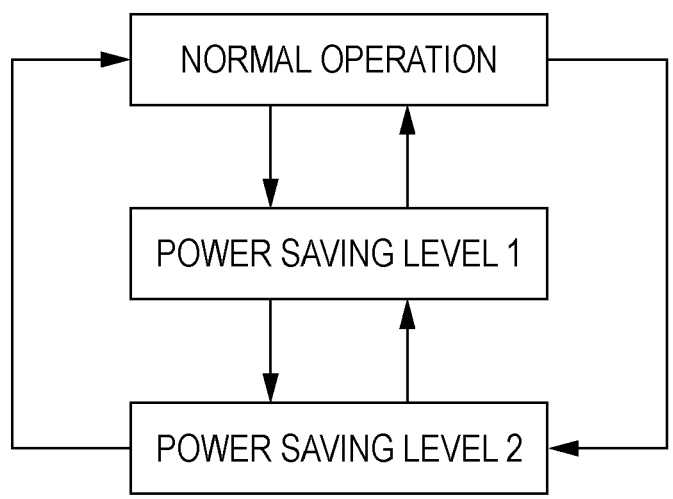
FIG. 2 is a state transition view showing a printer.

The printer 100 configured as above may select three types of power saving operations such as the normal operation, the power saving level 1, and the power saving level 2 as shown in FIG. 2, and realize an appropriate power state corresponding to a usage state of the printer 100. Further, an operation in the power saving level 1 corresponds to the first power saving operation, and an operation in the power saving level 2 corresponds to the second power saving operation.

In a normal state, any one of the first control unit 10, the second control unit 20, and the printing engine 30 is operated. Accordingly, when the image data or the print command is inputted to the NW I/F 25 from the external apparatus, the first control unit 10 may receive the inputted image data or print command, and perform a predetermined image process with respect to the image data. In addition, the printing engine 30 may immediately perform a printing based on the image data and the print command which are inputted from the first control unit 10.

In the power saving level 1, the printing engine 30 is stopped while the first control unit 10 and the second control unit 20 are operated. Accordingly, when the image data or the print command is inputted to the NW I/F 25 from the external apparatus, the first control unit 10 may receive the inputted image data or print command, and perform the predetermined image processing with respect to the image data. However, since the printing engine 30 starts after data is inputted from the NW I/F 25, a printing is delayed by a portion of the starting time of the printing engine 30.

In the power saving level 2, the first control unit 10 and the printing engine 30 are stopped, and only the second control unit 20 is operated. Accordingly, when the image data or the print command is inputted to the NW I/F 25 from the external apparatus, the receiving of the image data or the print command or the image processing is initiated after the first control unit 10 starts. In addition, the printing engine 30 also starts after data is received from the NW I/F 25. As a result, a printing is delayed by a portion of the starting time of the first control unit 10 or the printing engine 30.

Figure 3:
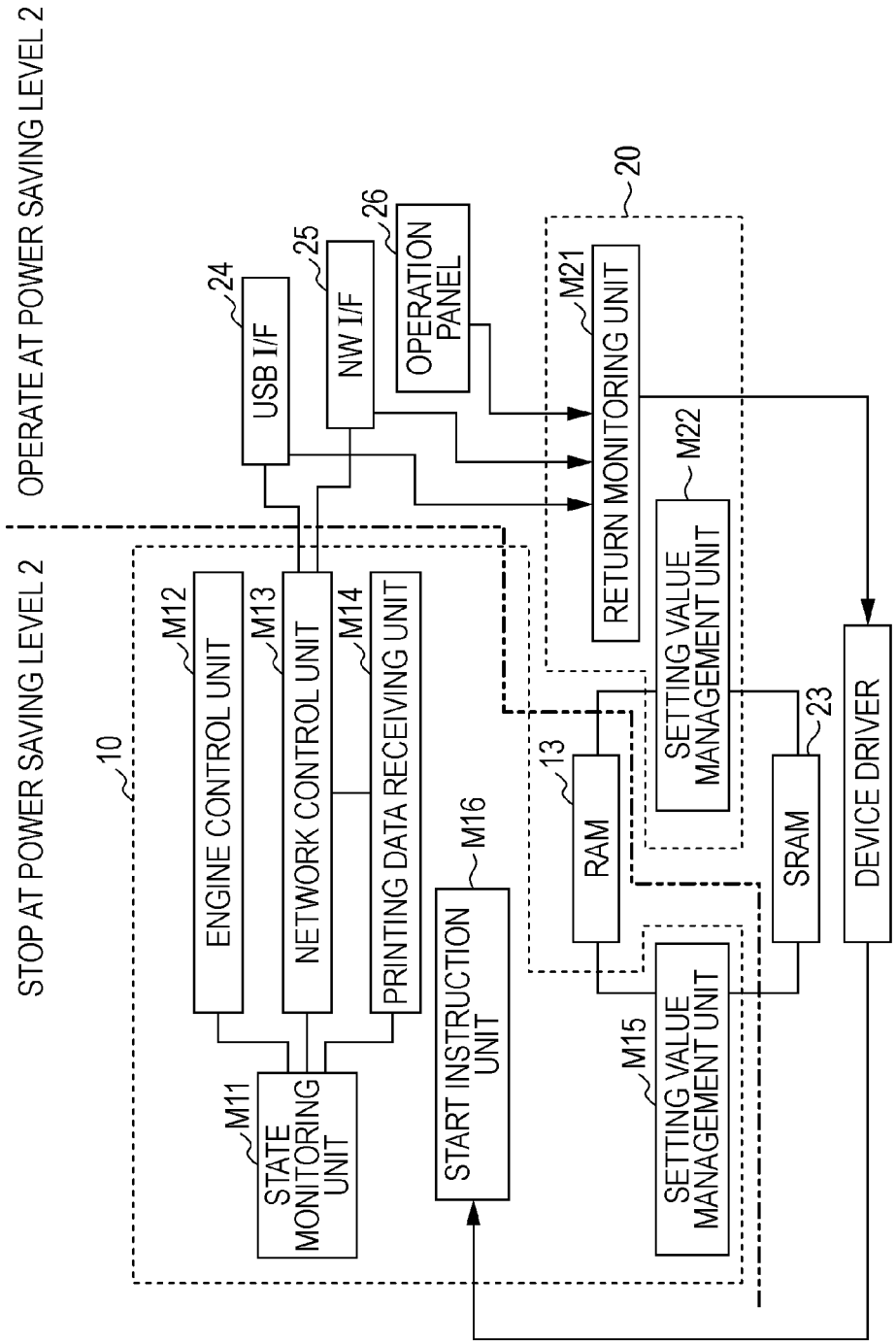
FIG. 3 is a block view showing a software configuration of a printer.

In the respective control units configured as above, various kinds of modules shown in FIG. 3 are realized by executing the firmware. FIG. 3 is a block view showing a software configuration of the printer 100.

First, the first control unit realizes functions corresponding to respective modules of a state monitoring unit M11, an engine control unit M12, a network control unit M13, a printing data receiving unit M14, a setting value management unit M15, and a start instruction unit M16 by executing the firmware.

The state monitoring unit M11 monitors whether to shift to a power saving level 1 and a power saving level 2 based on a usage state of the printer 100. The engine control unit M12 performs an engine communication with the printing engine 30. The network control unit M13 performs a network communication. The printing data receiving unit M14 receives data from a network or an interface such as a USB. The setting value management unit M15 receives a setting change executed from a personal computer and the like through the operation panel 26 or the NW I/F 25 during the normal operation or the power saving level 1 to thereby change the setting value stored in the RAM 13, or responds with any one of appropriate values of the user setting value and the operation value when there is an inquiry regarding the setting value from each unit.

In addition, the second control unit 20 realizes functions corresponding to each module of the return monitoring unit M21 and a setting value management unit M22 by executing the firmware. The setting value management unit M22 manages the setting value of the printer 100. The return monitoring unit M21 monitors a trigger for return, and instructs a start of the first control unit 10 to the start instruction unit M16 upon detecting the trigger. The trigger, for example, is a pressing operation of a power saving button for instructing a return from the power saving operation provided in the operation panel 26, or an input of the printing data from the external apparatus regarding a communication I/F such as the NW I/F 25 or an USB I/F 24. The start instruction unit M16 sequentially starts the respective modules M11 to M15. In addition, the setting value management unit M22 receives the executed setting change from the personal computer and the like through the operation panel 26 or the NW I/F 25 during the power saving level 2 to thereby change the operation value or the setting value each stored in the SRAM 23, or respond with any one of appropriate values of the user setting value and the operation value when there is an inquiry regarding the setting value from the respective units. Further, the setting value management unit M22 configures the setting value management unit or the setting value change receiving unit according to the embodiment.

Next, a power saving processing performed by the above described configuration and a return processing from power saving will be described in detail.

2. Power Saving Process

Figure 4:
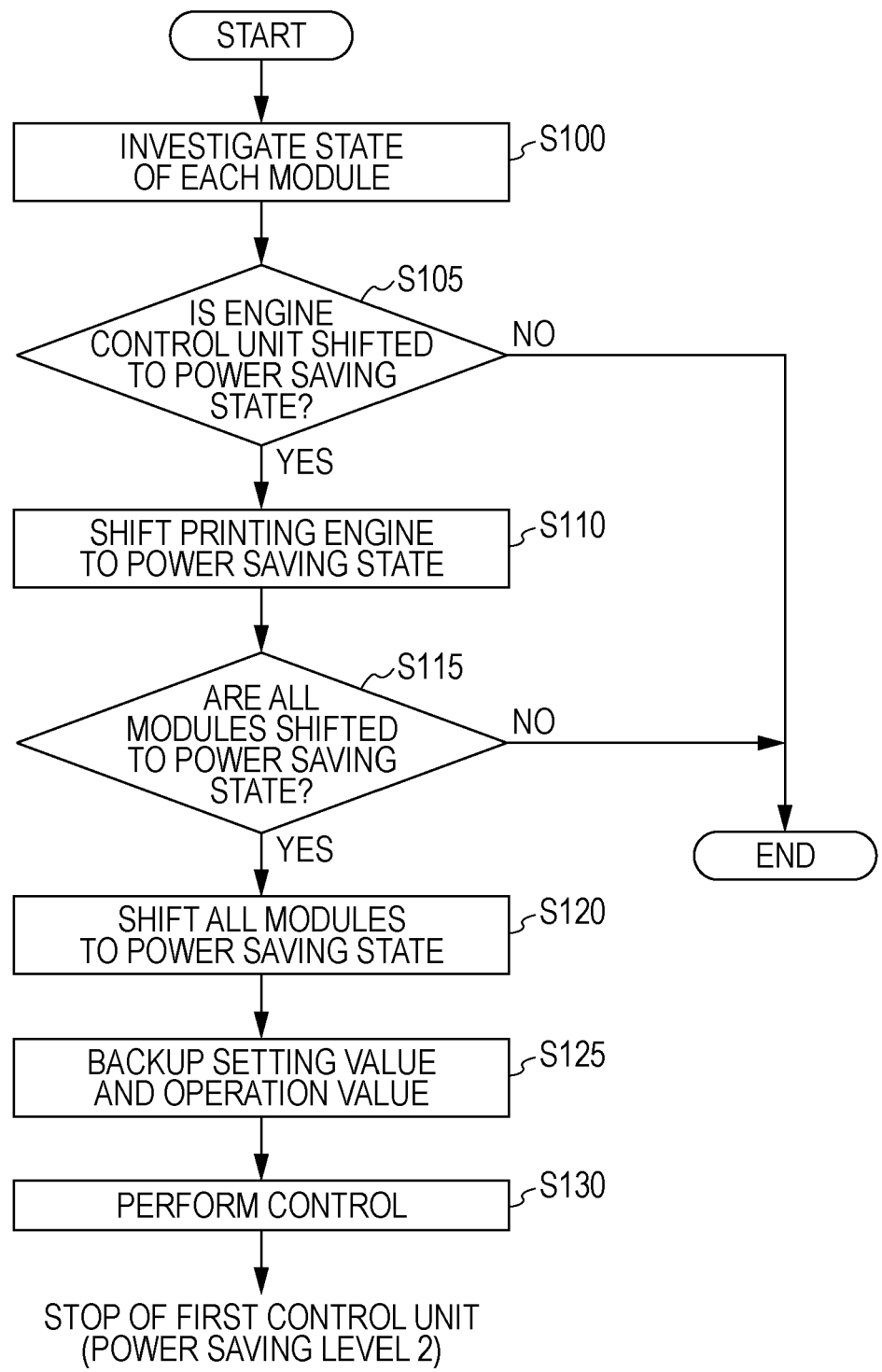
FIG. 4 is a flowchart showing a flow of a power saving process.
Figure 5:
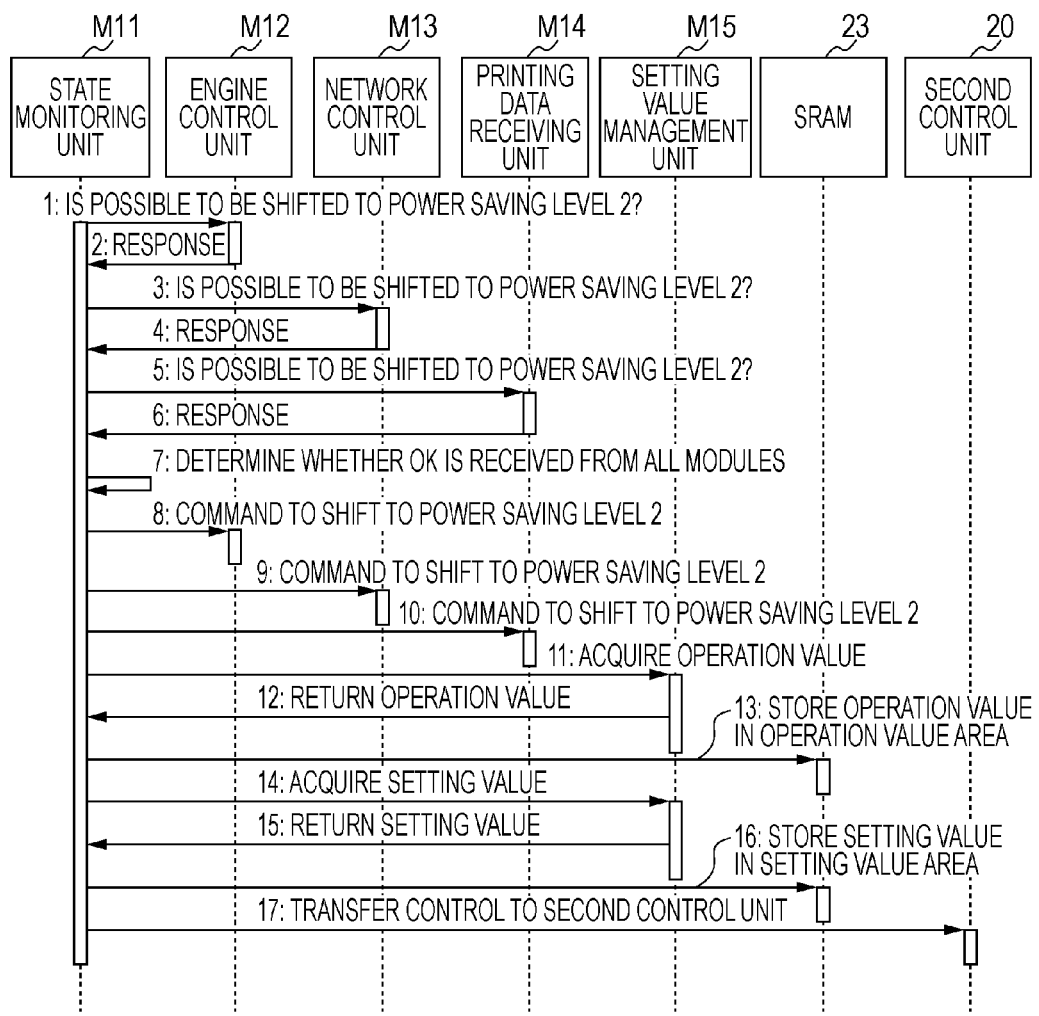
FIG. 5 is a schematic view showing communication performed between respective modules when shifted to a power saving level 2.

FIG. 4 is a flowchart showing a flow of a power saving process, and FIG. 5 is a schematic view showing communication performed between respective modules when shifted to a power saving level 2. The process shown in FIG. 3 is repeatedly performed at predetermined time intervals by the state monitoring unit M11 of the first control unit 10. That is, the printer 100 where the first control unit 10 is operated is executed during the normal state or the power saving level 1. The predetermined time is a time determined by the setting value set when a state of the printer is shifted to the above described power saving.

In step S100, the state monitoring unit M11 inquires of the respective modules M12 to M14 at predetermined time intervals whether the state of the printer is shifted to the power saving level 2.

The engine control unit M12 determines a printing execution state or an error occurrence state in the printing engine 30 when receiving, from the state monitoring unit M11, the inquiry about whether the state of the printer is shifted to the power saving level 2. The engine control unit M12 returns a response such that the state of the printing apparatus cannot be shifted to the power saving level 2, when the printing is being executed or when an error occurs, and returns a response such that the state of the printing apparatus can be shifted to the power saving level 2, when the printing is not being executed or when an error does not occur. Whether the printing is being executed or not can be determined by the presence or absence of a printing image in a buffer.

The printing data receiving unit M14 determines whether receiving of the printing data is processed or not when receiving, from the state monitoring unit M11, the inquiry about whether the state of the printer is shifted to the power saving level 2. The printing data receiving unit M14 determines that the receiving of the printing data is processed when the printing data is stored in a buffer for receiving processing of the printing data, when a print command is interpreted, or when a printing language is interpreted, and returns a response such that the state of the printing apparatus cannot be shifted to the power saving level 2, and otherwise, determines that the receiving of the printing data is not processed, and returns a response such that the state of the printing apparatus can be shifted to the power saving level 2. Further, the buffer for the receiving processing of the printing data is a memory of primarily storing the printing data.

The network control unit M13 determines whether a communication processing is executed when receiving, from the state monitoring unit M11, an inquiry about whether the state of the printer is shifted to the power saving level 2. The network control unit M13 determines that the communication processing is executed, when data is stored in a buffer for the communication processing, or when a connection with the external apparatus such as the personal computer and the like or with a host computer is made, and returns the response such that the state of the printing apparatus cannot be shifted to the power saving level 2, and otherwise, determines that the communication process is not executed, and returns the response such that the state of the printing apparatus can be shifted to the power saving level 2. Further, the buffer for the communication processing is a memory of primarily storing the printing data.

In step S105, the state monitoring unit M11 determines whether the engine control unit M12 returns the response such that the state of the printing apparatus can be shifted to the power saving level 2. When the engine control unit M12 returns the response such that the state of the printing apparatus can be shifted to the power saving level 2, the power saving process proceeds to step S110 to turn off power of the printing engine 30, and then proceeds to step S115 (S105: Yes). On the other hand, when the engine control unit M12 returns the response such that the state of the printing apparatus cannot be shifted to the power saving level 2, the power saving process is temporarily ended, and the power saving process is performed starting from step S100 at predetermined time intervals (S105: No). Further, according to the embodiment, a state where a condition in step S105 is satisfied, the power of the printing engine 30 is turned off, and a power of the memory control ASIC 11 is turned on is referred to as "power saving level 1".

In step S115, the state monitoring unit M11 determines whether the modules M12 to M14 return a response such that the state of the printer is shifted to the power saving level 2. When the modules M12 to M14 return a response such that the state of the printer is shifted to the power saving level 2, the power saving process proceeds to step S120 (S115: Yes), and when any one of returning of the response such that the state of the printing apparatus cannot be shifted to the power saving level 2, the power saving process is temporarily ended (S115: No). Then, the power saving process is performed starting from step S100 after a predetermined time elapses.

Further, the fact that the modules M12 to M14 can be shifted to the power saving level 2 means that a process relating to the printing is not performed in the memory control ASIC 11. That is, the determining process of steps S100 to S115 means that whether the power of the memory control ASIC 11 is turned off is determined.

In step S120, the state monitoring unit M11 shifts the respective modules M12 to M14 to the power saving level 2. The engine control unit M12 backs up, in the SRAM 23, information other than the setting value among information required for return from the power saving level 2 when a shift command to the power saving level 2 is inputted, and stops a power supply to the printing engine 30. The network control unit M13 or the printing data receiving unit M14 blocks networking when the shift command to the power saving level 2 is inputted. Further, when the state of the printer is shifted to the power saving level 2, the second control unit 20 resumes a network connection.

In step S125, the state monitoring unit M11 backs up, in the SRAM 23, the setting value obtained by performing an inquiry regarding the setting value with respect to the setting value management unit M15. The state monitoring unit M11 executing step S125 configures the setting value backup unit according to the embodiment. Hereinafter, types of setting items for setting each setting value will be described in detail. The setting item of the printer 100 includes "a first type of setting item" and "a second type of setting item".

The first type of setting item is a setting item that reflects, on an operation, a value where a setting change is performed during a return from the power saving level 2. In addition, when the first type of setting item is changed while the printer 100 is operated in the normal operation or the power saving level 1, the changed value is immediately reflected in a control operation.

The first type of setting item includes setting items of, for example, a display language, a paper size of a paper feeder, a time and a time difference of the printer, a condition (shift condition) satisfying an inactivity time until being shifted to power saving or satisfying a trigger shifted to power saving. Also, an IP address of a network displayed when a user displays a present setting state on a display unit of the operation panel is included in the first type of setting item. However, an IP address used in an actual network connection as described below is included in the second type of setting item.

The second type of setting item is a setting item that does not reflect the value where the setting change is performed during the power saving level 2, when returning from the power saving level 2. Also, the second type of setting item is a setting item that becomes effective when power is supplied to the printer 100, or when the printer 100 re-starts. Here, even though the second type of setting item is changed during operation of the printer 100, the value before the change is reflected in the control operation until the printer 100 re-starts.

The second type of setting item includes setting items of, for example, an IP address of a network, region information of an RAM disk, a switching for use/non-use of a network I/F such as Ethernet (registered trademark) or USB, and whether a paper size for a paper to be fed is automatically detected. The RAM disk is a region holding printing jobs when a confidential printing is performed in the printer 100, and is used in such a manner that a part of the RAM 13 is designated. The paper size of a paper feed cassette is automatically detected based on a position of a paper guide mounted in each paper feed cassette, and becomes an indeterminate type when the automatic detection is turned off.

Figure 6:
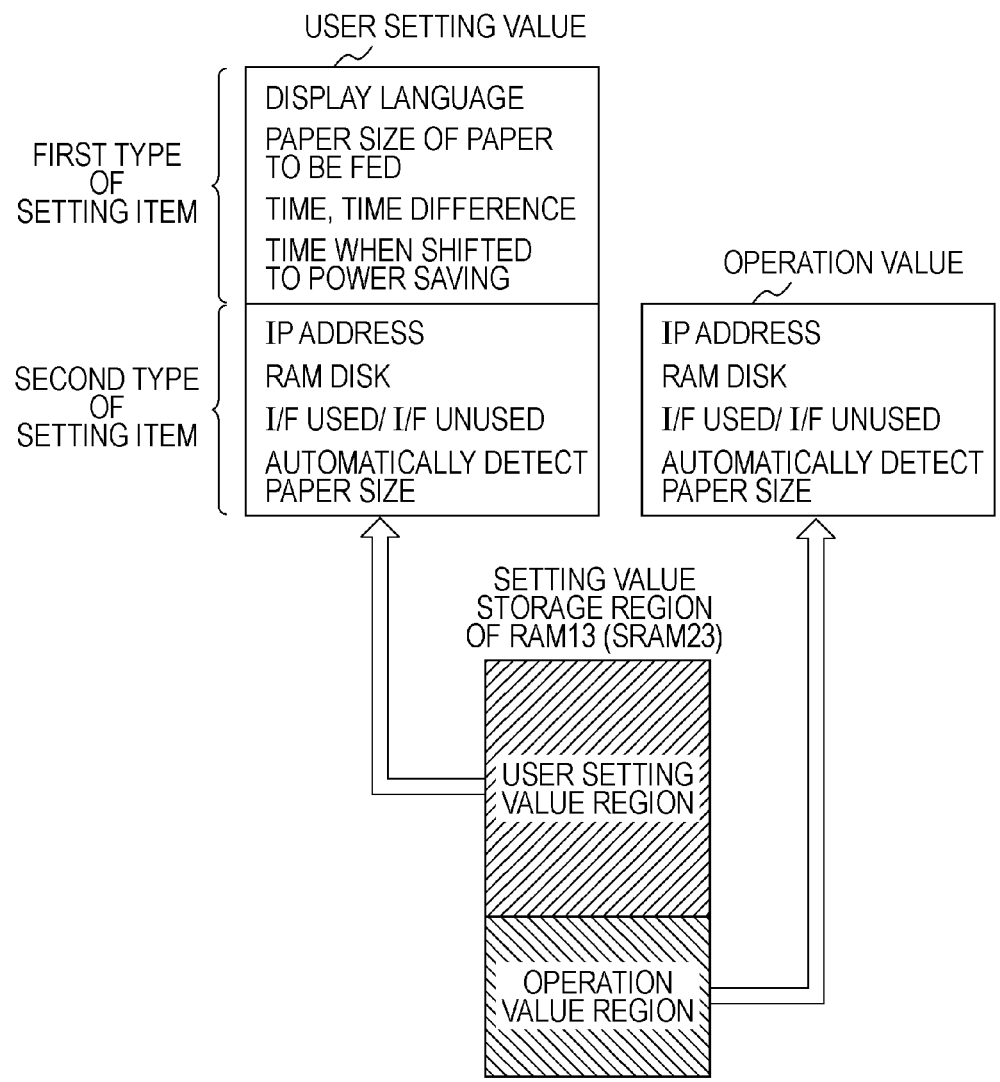
FIG. 6 is a conceptual view showing a memory region storing a setting value.

FIG. 6 is a conceptual view showing a memory region storing a setting value. The memory region is formed in a setting value storage region of the RAM 13 during the normal operation or the power saving level 1, and formed in a setting value storage region of the SRAM 23 during the power saving level 2. That is, according to the embodiment, the RAM 13 configures the first storage unit, and the SRAM 23 configures the second storage unit.

As shown in FIG. 6, the memory region storing the setting value includes "a user setting value region" for storing a user setting value, that is, the latest value set by a user and "an operation value region" for storing an operation value considered during the operation of the printer 100. The user setting value includes all setting values, and the operation value only includes the setting value that is determined when the power of the printer 100 is supplied or when the printer 100 re-starts, and is not changed during the operation of the printer 100. That is, the user setting value includes all setting values of the first type of setting item and the second type of setting item, and the operation value only includes the setting value of the second type of setting item. That is, when the setting change is performed by the user during the operation of the printer 100, the operation value is not changed even though the user setting value is changed.

So that the setting value includes the user setting value and the operation value as described above, the state monitoring unit M11 requires each user setting value and each operation value in step S125 from the setting value management unit M22. The setting value management unit M22 acquires the required setting value from the setting value storage region of the RAM 13, and returns a response to the state monitoring unit M11. The state monitoring unit M11 respectively stores, in the user setting value region and the operation value region of the setting value storage region of the SRAM 23, each of the user setting value and the operation value where the response is received from the setting value management unit M22. In this manner, by backing up, in the SRAM, the user setting value and the operation value, the same operation value as that before the state of the printer is shifted to the power saving level 2 may be rewritten in the RAM 13 when returning from the power saving level 2 to the power saving level 1 or the normal state. Also, the user setting value where the setting change performed during the power saving level 2 is reflected may be rewritten in the RAM 13. When the backup of step S125 is completed, the power saving process proceeds to step S130.

In step S130, the state monitoring unit M11 transfers, to the second control unit 20, an object to be controlled, and stops the memory control ASIC 11 by stopping a power supply regarding the memory control ASIC 11. As a result, the state of the printer 100 is shifted to the power saving level 2.

3. Return Process from Power Saving

Next, referring to FIGS. 7 and 8, a return process from the power saving level 2 to the normal state or the power saving level 1 will be described in detail. Further, in the following description, a return from the power saving level 2 to the normal state will be described; however, in a return from the power saving level 2 to the power saving level 1, only whether the engine control unit M12 re-starts a power supply regarding a mechanical part of the printing engine 30 differs. Whether to return from the power saving level 2 to the normal state or to the power saving level 1 may be switched to whether or not a process, which corresponds to an operation such as a trigger of the return, requires a printing.

Figure 7:
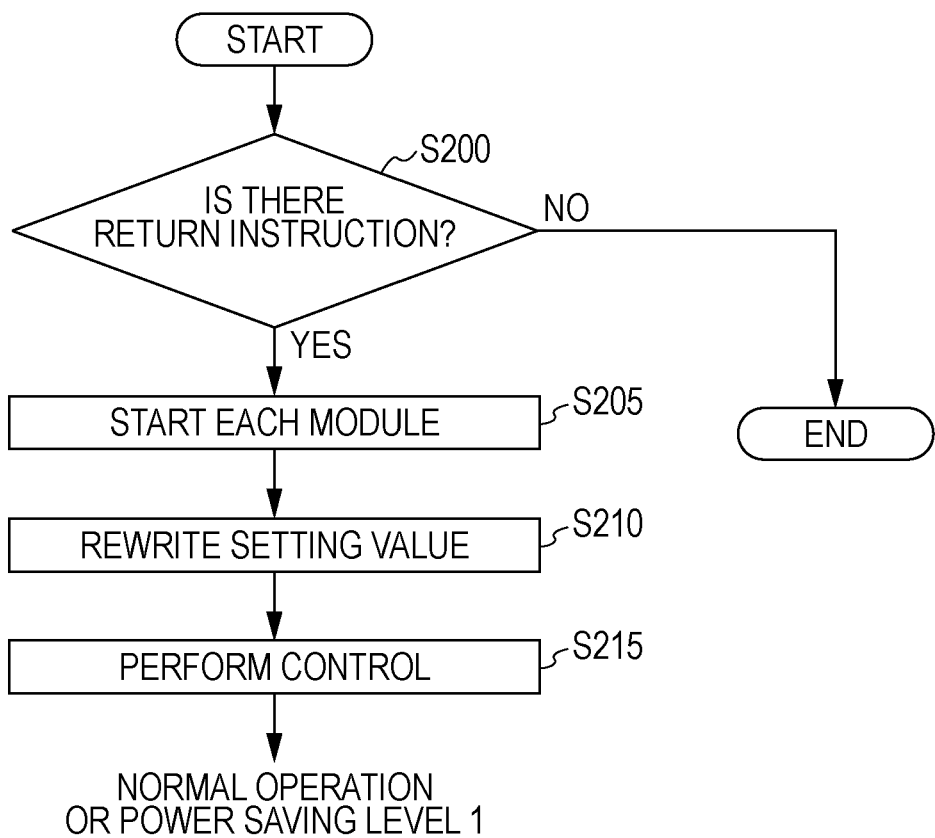
FIG. 7 is a flowchart showing a flow of a return process from power saving.
Figure 8:
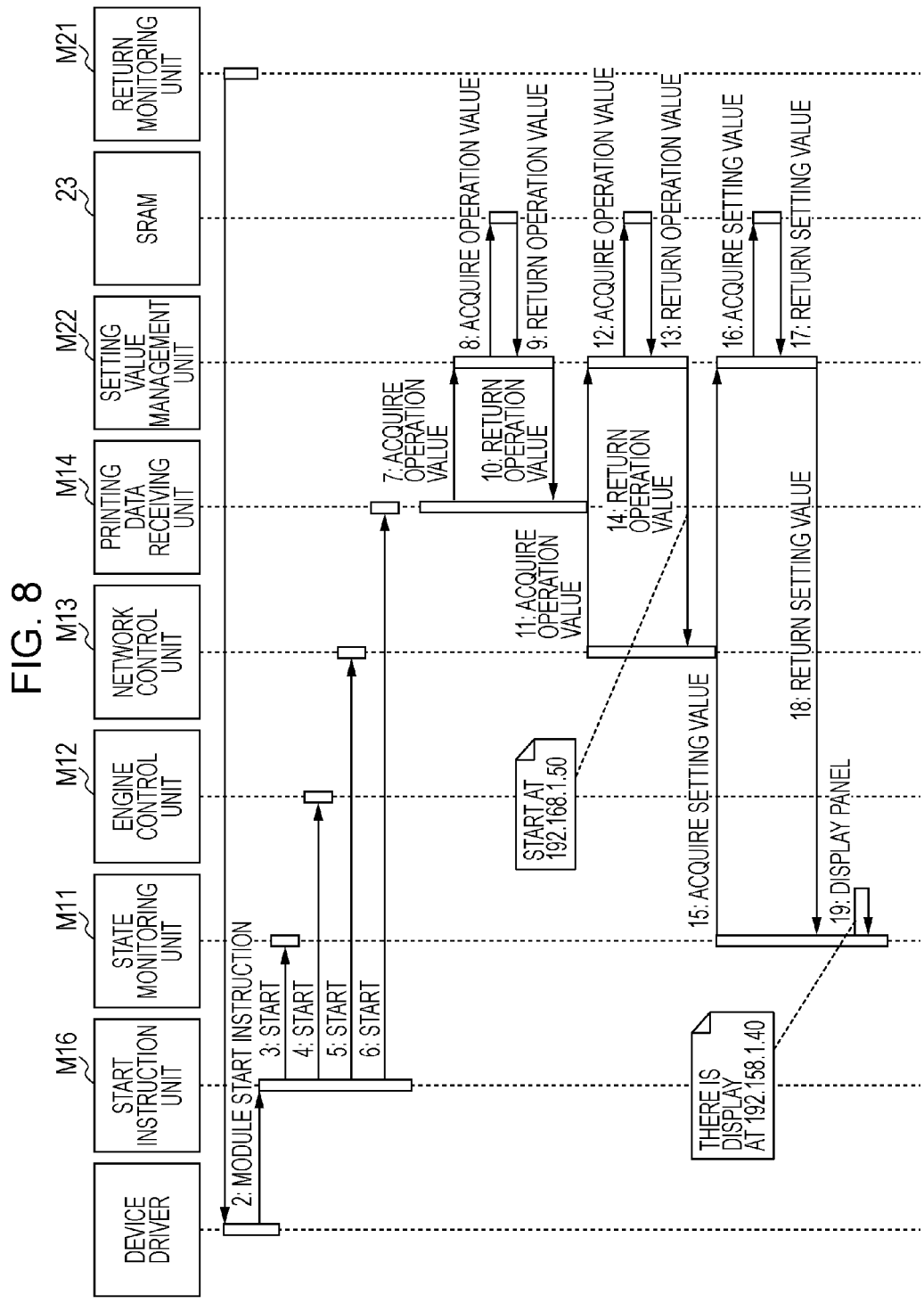
FIG. 8 is a schematic view showing communication performed between respective modules when returning from a power saving level 2 to a normal state.

FIG. 7 is a flowchart showing a flow of a return process from power saving, and FIG. 8 is a schematic view showing communication performed between respective modules when returning from a power saving level 2 to a normal state. Processes shown in FIGS. 7 and 8 are repeatedly performed by the return monitoring unit M21 at predetermined time intervals during the power saving level 2. The predetermined time is set as the setting value regarding a time when the state of the printer is shifted to the above described power saving, however, the predetermined time of the power saving process and the predetermined time of the return process may differ from each other.

In step S200, the return monitoring unit M21 monitors an input of the above described trigger of the return. The return monitoring unit M21 proceeds to step S200 when detecting the input of the trigger of the return, and temporarily ends the return process when the input of the trigger of the return is not detected to repeatedly perform the return process starting from step S200 after the predetermined time elapses.

In step S205, the return monitoring unit M21 starts respective modules. The return monitoring unit M21 issues an instruction for return to a device driver. Then, the device driver instructs the return with respect to the start instruction unit M16. The start instruction unit M16 sequentially starts the respective modules M11 to M15. As for the respective modules, a module requiring the operation value at the time of starting inquires of the setting value management unit M22 about the operation value, and a module requiring the user setting value inquires of the setting value management unit M22 about the user setting value.

For example, when the IP address is changed from "192.168.1.50" to "192.168.1.40" before the state of the printer is shifted to the power saving level 2, the operation value is "192.168.1.50", and the user setting value is "192.168.1.40". In this instance, the network control unit M13 acquires the operation value since a network connection is required to be actually performed using the IP address. On the other hand, the state monitoring unit M11 acquires the user setting value since the IP address currently set by a user is required to be displayed on a display panel.

In step S210, the return monitoring unit M21 rewrites, in the setting value storage region of the RAM 13, the operation value and the user setting value each stored in the SRAM 23.

In step S215, the return monitoring unit M21 transfers a control to the first control unit 10, and the return monitoring unit M21 completes the return process.

By performing the above described power saving process and return process, operations when seen from a user in the return from the power saving level 2 to the normal operation and the return from the power saving level 1 to the normal operation may coincide with each other. Accordingly, a user's convenience is not degraded. In addition, when returned from the power saving, the printer can be used in the same state as that before entering into the power saving. In addition, when the setting value is changed in the power saving level 2, the change performed in the power saving level 2 is added in the state before entering into the power saving, so that the change can be effectively reflected in the operation after the return.

4. Summary and Modified Example

According to the above described embodiment, the printer 100 that selects the normal operation where the printing engine 30 and the first control unit 10 are operated, the power saving level 1 where the printing engine 30 stops and at least the first control unit 10 is operated, or the power saving level 2 where only the second control unit 20 is operated, includes the RAM 13 storing the setting value (user setting value and the operation value) and the SRAM 23 storing the setting value. Here, when the normal operation is shifted to the power saving level 1 or to the power saving level 2, the setting value of the RAM 13 may be stored in the SRAM 23, and the second control unit 20 may receive a change in the setting value stored in the SRAM 23. Also, when the power saving level 2 is shifted to the normal operation or to the power saving level 1, the setting value of the SRAM 23 is rewritten in the RAM 13, the user setting value is reflected in the first type of setting item, and the operation value is reflected in the second type of setting item. Accordingly, a user is unaware of a plurality of the power saving levels.

Further, the invention is not limited to the aforementioned embodiment or modified example, and includes a configuration where respective configurations disclosed in the aforementioned embodiment of a modified example are replaced with each other or a combination thereof is changed, a configuration where respective configurations disclosed in the aforementioned embodiment and modified example and in the related art are replaced with each other or a combination thereof is changed, and the like.

The entire disclosure of Japanese Patent Application No. 2010-026863, filed Feb. 9, 2010 is expressly incorporated by reference herein.

What is claimed is:

1. A printing apparatus having a printing engine, a first control unit, and a second control unit, in which a normal operation is performed by at least the printing engine and the first control unit, a first power saving operation is performed by at least the first control unit while the printing engine is stopped, and a second power saving operation is performed by only the second control unit, the printing apparatus comprising:
a first storage unit of the first control unit that stores a setting value reflecting a setting change performed while the printing apparatus is operated and an operation value not reflecting the setting change performed while the printing apparatus is operated;
a second storage unit of the second control unit that stores the setting value and the operation value; and
a setting value backup unit that stores the setting and operation values of the first storage unit in the second storage unit when the normal operation or the first power saving operation is shifted to the second power saving operation,
wherein the second control unit includes a setting value-change receiving unit that receives a change in the setting value stored in the second storage unit, and
the printing apparatus further includes a setting value management unit that rewrites the setting value and the operation value from the second storage unit to the first storage unit when the second power saving operation is shifted to the normal operation or when the second power saving operation is shifted to the first power saving operation, wherein the setting value management unit includes a first type of setting item, wherein a setting change of the first type of setting item which is received during the second power saving operation is immediately reflected in a control operation while the printing apparatus is maintained so as to remain in the second power saving operation, and a second type of setting item, wherein a setting change of the second type of setting item performed during operation of the printing apparatus or which is received during the second power saving operation is reflected upon the printing apparatus being restarted,
wherein the first type of setting item includes at least one of a display language of a display unit, a paper size of a paper feeder, a time setting, and a shift condition from the normal operation to the first power saving operation or the second power saving operation.

2. The printing apparatus according to claim 1, wherein the second type of setting item includes at least one of an Internet Protocol (IP) address used for network connection, a region setting of a Random Access Memory (RAM) disk, a switching setting for use/non-use of network I/F, and an on/offsetting of automatic detection for a paper size of each paper feed cassette.

3. The printing apparatus according to claim 1, wherein, when there is an inquiry relating to the printing apparatus from an external apparatus connected to the printing apparatus during operation in the second power saving operation, the second control unit responds based on the setting value and the operation value each stored in the second storage unit.

4. The printing apparatus according to claim 1, wherein the first storage unit is a volatile storage medium not having a self-refresh function.

5. The printing apparatus according to claim 1, wherein the first control unit is turned off during the second power saving operation and wherein the second storage unit is accessible by the second control unit during the second power saving operation without turning the first control unit on.

6. The printing apparatus according to claim 1, wherein the change in the setting value stored in the second storage unit is received during the second power saving operation.

7. A method of controlling a printing apparatus having a printing engine, a first control unit, and a second control unit, in which a normal operation is performed by at least the printing engine and the first control unit, a first power saving operation is performed by at least the first control unit while the printing engine is stopped, and a second power saving operation is performed by only the second control unit, the printing apparatus including a first storage unit of the first control unit that stores a setting value reflecting a setting change performed while the printing apparatus is operated and an operation value not reflecting the setting change performed while the printing apparatus is operated, and a second storage unit of the second control unit that stores the setting value and the operation value, the method comprising:

storing the setting and operation values of the first storage unit in the second storage unit when the normal operation or the first power saving operation is shifted to the second power saving operation;

receiving a change in the operation value or the setting value each stored in the second storage unit by the second control unit; and rewriting the setting value and the operation value from the second storage unit to the first storage unit using a setting value management unit when a state of the printer is shifted from the second power saving operation to the normal operation or when the first power saving operation is shifted to the normal operation, reflecting the setting value in a first type of setting item which reflects, in the operation, a setting change performed during operation of the printing apparatus, wherein the setting value management unit includes a first type of setting item, wherein a setting change of the first type of setting item which is received during the second power saving operation is immediately reflected in a control operation while the printing apparatus is maintained so as to remain in the second power saving operation, and a second type of setting item, wherein a setting change of the second type of setting item performed during operation of the printing apparatus or which is received during the second power saving operation is reflected upon the printing apparatus being restarted, wherein the first type of setting item includes at least one of a display language of a display unit, a paper size of a paper feeder, a time setting, and a shift condition from the normal operation to the first power saving operation or the second power saving operation.

8. The method according to claim 7, wherein the first control unit is turned off during the second power saving operation and wherein the second storage unit is accessible by the second control unit during the second power saving operation without turning the first control unit on.

\* \* \* \* \*